United States Patent [19]

Pollock

[11] 4,272,375
[45] Jun. 9, 1981

[54] LONG VERTICAL SHAFT BIOREACTOR OF SIMPLIFIED DESIGN

[75] Inventor: David C. I. Pollock, Richmond Hill, Canada

[73] Assignee: C-I-L Inc., Montreal, Canada

[21] Appl. No.: 159,353

[22] Filed: Jun. 13, 1980

[30] Foreign Application Priority Data

Oct. 26, 1979 [CA] Canada .................................. 338538

[51] Int. Cl.³ .............................................. C02F 3/22
[52] U.S. Cl. ..................................... 210/194; 210/256; 210/221.1; 261/124
[58] Field of Search ................ 210/608, 620, 621–628, 210/703, 194, 629, 195.1, 195.3, 220, 221.1, 221.3, 256, 170, 747; 261/36 R, 124

[56] References Cited

U.S. PATENT DOCUMENTS

| | | | |
|---|---|---|---|
| 3,983,031 | 9/1976 | Kirk | 210/220 |
| 4,086,160 | 4/1978 | Roesler | 210/221.3 |
| 4,136,023 | 1/1979 | Kirk et al. | 210/194 |
| 4,230,563 | 10/1980 | Roesler | 210/629 |

OTHER PUBLICATIONS

Proceedings of the 31st Industrial Waste Conference, May 4, 5, 6, 1976; Purdue University, Ann Arbor Science; pp. 344–351, (1977).

*Primary Examiner*—Benoit Castel
*Attorney, Agent, or Firm*—Donald G. Ballantyne

[57] ABSTRACT

An improved long vertical shaft bioreactor for the treatment of degradable waste is provided wherein the head tank or basin surmounting the vertical downcomer and riser chambers is surrounded by a foam oxidation vessel. Conduits are provided between the head tank and the foam vessel through which (a) foam accumulated in the head tank is passed to the foam vessel and (b) through which excess fluid in the head tank may be vented.

1 Claim, 2 Drawing Figures

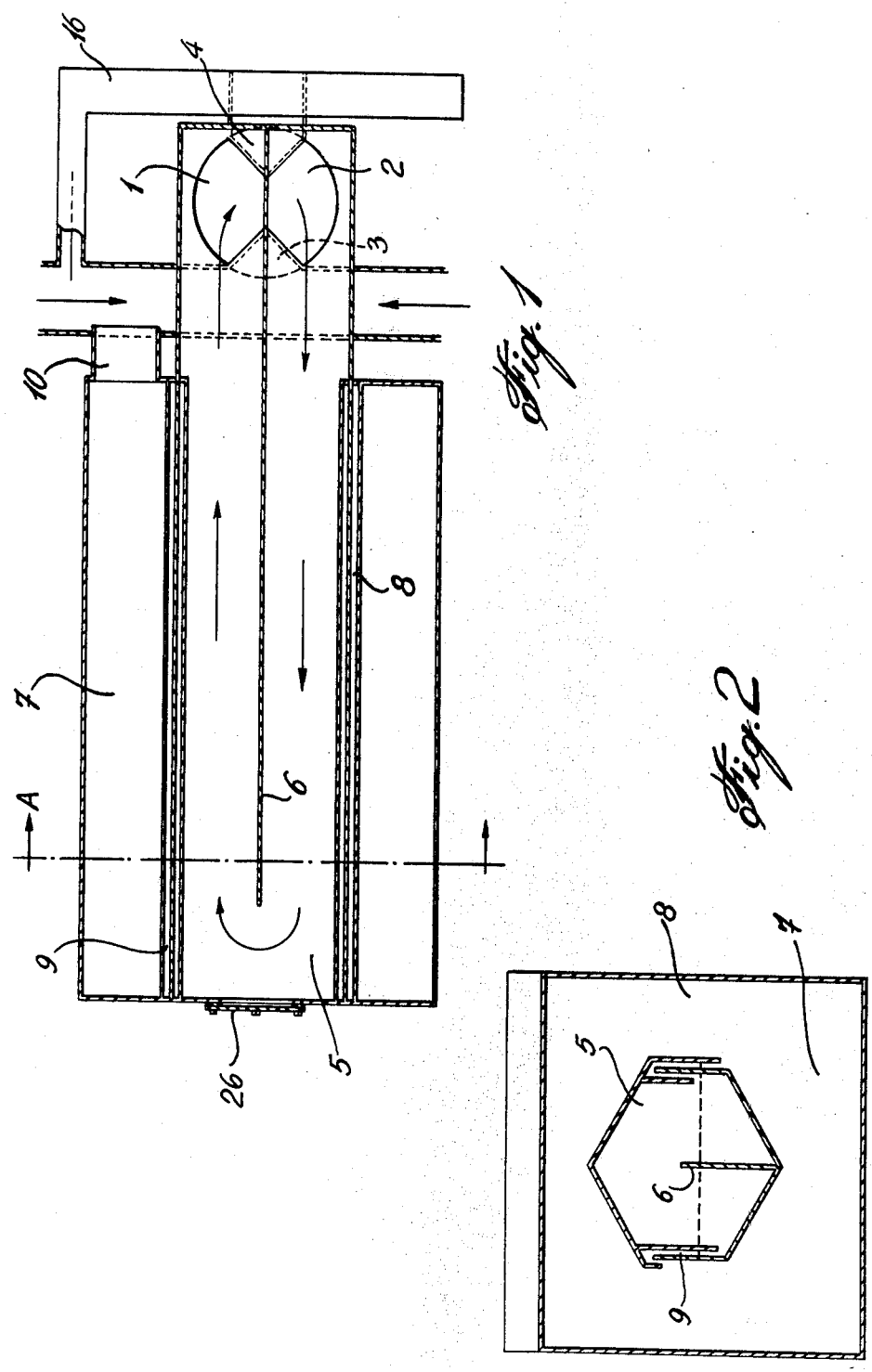

LONG VERTICAL SHAFT BIOREACTOR OF SIMPLIFIED DESIGN

This invention relates to a long vertical shaft bioreactor for the treatment of waste having means for the additional treatment of the foamable fraction of the waste wherein the apparatus has been simplified.

Long vertical shaft bioreactors suitable for the treatment of waste water by a modified activated sludge process are known, being disclosed for example in Canadian Pat. No. 1,033,081 to Bailey et al. Such bioreactors comprise a circulatory system including at least two substantially vertical chambers communicating with each other at their upper and lower ends, the upper end being connected to a basin. The waste water is caused to descend one chamber (the downcomer) and ascend the other chamber (the riser).

Normally, the waste water is driven through the system by the injection at depth of oxygen-containing gas, usually air, into one or both of the chambers. Typically, in a 500 foot deep bioreactor and employing air at a pressure of 100 pounds per square inch, injection is at a depth of about 200 feet. At start up of the bioreactor the injection will be into the riser where it acts in the nature of an air lift pump. Once circulation of the waste begins, injection can be into the downcomer only, the fluid in the downcomer having a higher density than the liquid/bubble mixture of the riser, thus providing sufficient force to maintain circulation. Influent waste water is introduced into the basin at a position adjacent to the upper end of the downcomer. Treated waste water is drawn off from the basin at a position adjacent to the upper end of the riser. Usually the basin is fitted with a baffle that forces waste water from the top of the riser to traverse a major part of the basin before again ascending the downcomer.

The injected oxygen-containing gas dissolves in the waste water as the water descends to regions of greater hydrostatic pressure. The dissolved oxygen constitutes the principal reactant in the biochemical degrading of the waste. As the circulating waste water rises in the riser to regions of lower hydrostatic pressure, dissolved gas separates forming bubbles. When the liquid/bubble mixture from the riser enters the basin, gas disengagement occurs. Reaction between waste water, dissolved oxygen, nutrients and biomass takes place during circulation through the downcomer, riser, basin system. The products of the reaction are carbon dioxide, and additional biomass which, in combination with inert material present in the influent waste water, forms a sludge.

The term "waste water" is understood to include water carrying any type of biodegradable domestic and industrial waste materials, for example, normal domestic waste and the effluents produced by farms, food factories and other industries. The mixed liquid/solid contents of the bioreactor are known as the "mixed liquor".

In our copending United States patent application entitled "A method for the froth flotation separation and treatment of slowly biodegradable components in waste treatment" and filed June 13, 1980, there is disclosed a method for the froth flotation separation of the difficultly biodegradable components of waste water and the separate biological oxidation of the same. In the preferred embodiment of the method of the above application, waste-carrying foam collects on the surface of the mixed liquor in the pressurized basin or head tank of the bioreactor from whence it is forced by pressure within the head tank to pass beneath the surface of liquid in an adjacent foam oxidation vessel. In the foam oxidation vessel, biomass carried over with the foam reacts with the foam-borne waste in the presence of oxygen to degrade the waste. This treatment has been found to be effective in handling hard-to-degrade components of waste water. However, the use of a pressurized bioreactor system involves complexity in the design of pressure vessels and requires control devices which may be complicated and which require continuing maintenance attention. Thus a simplification of the structure and control system will provide an apparatus that is easier to construct and maintain with resulting economic advantages. These results have been achieved in the improved bioreactor of the present invention.

The improved bioreactor of the present invention comprises an enclosed upper basin or head tank, a long vertical downcomer chamber, a long vertical riser chamber, the downcomer and riser chambers operatively communicating with each other directly at their lower ends and through the head tank at their upper ends thus forming a circulatory loop, both the downcomer chamber and the riser chamber having means for the injection therein at depth of an oxygen-containing gas, a waste influent conduit operatively opening into said riser chamber at a location above the location of the means for injecting oxygen-containing gas into said riser chamber, a waste effluent conduit operatively discharging from said riser chamber at a location below the location of the means for injecting oxygen-containing gas into said riser chamber, the improvement comprising a foam oxidation vessel surrounding the said head tank in such a manner that the head tank is normally immersed in liquid in the foam oxidation vessel, the said head tank and foam oxidation vessel, having first and second conduit means therebetween, said first conduit means comprising an inverted J configuration with the short arm of the J discharging from the head tank at a position above the normal liquid level in the head tank, the said second conduit means comprising an inverted J configuration with the long arm of the J discharging from the head tank at a position below the normal liquid level in the head tank, the said first conduit means being adapted to transfer foam from the surface of the head tank to the liquid in the foam oxidation vessel, the said second conduit means being adapted to compensate for increased pressure in the head tank caused by extreme surges of the influent discharge into the bio-reactor.

Although the bioreactor of this invention may be operated with liquid inflow and outflow controlled in response to the liquid level in the head tank, control by an influent waste holding tank with flotation tank bottom recycle is preferred. Such a control system is described in our copending United States patent application entitled "Means for the separation of gas and solids from waste mixed liquor" and filed concurrently herewith on June 13, 1980. In the abovementioned application flow control is varied in response to the head of liquid in an influent holding reservoir. When the level of liquid in said holding reservoir rises, an increased pressure results at the submerged discharge port of the flotation tank recycle duct thereby reducing the rate of recycle flow. In like manner a drop in height of liquid in said holding reservoir will cause an increase in recycle flow from the flotation tank.

The present invention is illustrated in the accompanying drawings wherein:

FIG. 1 is a cut-away plan view of the head tank foam oxidation vessel assembly showing the connections to the downcomer and riser chambers;

FIG. 2 is a sectional view along line A—A of FIG. 1.

Referring to the drawings a downcomer chamber is shown at 1 and a riser chamber at 2. At 3 is a waste influent conduit and at 4 a waste effluent conduit. Head tank 5 is enclosed and is adapted to operate under pressure. Head tank 5 is operatively connected to downcomer 1 and riser 2 so that mixed liquor issuing from riser 2 passes around baffle 6 in head tank 5 and then descends downcomer 1. Means are provided (not shown) for injecting an oxygen-containing gas (e.g. air) at depth into both downcomer 1 and riser 2. Surrounding the side walls of head tank 5 is foam oxidation vessel 7. Head tank 5 is connected to foam oxidation vessel 7 by slit type ducts 8 and 9. In cross section these ducts have inverted J configurations. Duct 8 has the opening of the short arm of the J positioned above the normal surface level of the mixed liquor in the head tank. Thus foam on the surface of the liquid in tank 5 will be swept through duct 8 into the mixed liquor in foam oxidation vessel 7 by the current of gas disengaged from the head tank mixed liquor. In foam oxidation vessel 7 waste carried thereto by the foam will be degraded by biomass in the presence of the oxygen-containing gas disengaged from the mixed liquor in head tank 5. Duct 9 has the opening of the long arm of the J positioned beneath the normal surface level of the mixed liquor in head tank 5. Duct 9 serves to compensate for flow surges in head tank 5. If the level of mixed liquor in tank 5 rises, the flow of gas and foam through duct 8 will be cut off. As pressure increases, liquor will be forced upwards in duct 8 in admixture with gas and thereby pump mixed liquor into foam oxidation vessel 7. If the surge of liquor into head tank 5 is extreme, liquor will also pass out through duct 9. Mixed liquor from foam oxidation vessel 7 overflows through gate 10 into influent waste holding reservoir 16 from whence it is directed to waste influent conduit 3. Thus the contents of the foam oxidation tank are recycled through the bioreactor.

Access to head tank 5 for maintenance is through removable plate 26.

The improved long vertical shaft bioreactor of this invention is simpler in design with a reduced need for controls and auxiliary equipment. It is, therefore, more economic to construct and maintain.

The embodiments of the invention in which an exclusive property or privilege is claimed are defined as follows:

1. An improved long vertical shaft bioreactor comprising an enclosed head tank, a long vertical downcomer chamber, a long vertical riser chamber, the said downcomer and riser chambers operatively communicating with each other directly at their lower ends and through the said head tank at their upper ends thus forming a circulatory loop, both the said downcomer chamber and the said riser chamber having means for the injection therein at depth of an oxygen-containing gas, a waste influent conduit operatively opening into said riser chamber at a location above the location of the means for injecting oxygen-containing gas into said riser chamber, a waste effluent conduit operatively discharging from said riser chamber at a location below the location of the means for injecting oxygen-containing gas into said riser chamber, the improvement comprising a foam oxidation vessel surrounding the said head tank in such a manner that the said head tank is immersed in liquid in the foam oxidation vessel, the said head tank and foam oxidation vessel having first and second conduit means therebetween, said first conduit means comprising an inverted J configuration with the short arm of J discharging from the head tank at a position above the normal liquid level in the said head tank, the said second conduit means comprising an inverted J configuration with the long arm of the J discharging from the head tank at a position below the normal liquid level in the said head tank, the said first conduit means being adapted to transfer foam from the surface of the said head tank to the liquid in the said foam oxidation vessel, the said second conduit means being adapted to compensate for increased pressure in the said head tank caused by surges of influent discharge into the said bioreactor.

* * * * *